United States Patent
Takagi (10) Patent No.: US 7,253,006 B2
(45) Date of Patent: Aug. 7, 2007

(54) DEVICE AND METHOD FOR MANUFACTURING BEAD ARRAY, AND METHOD FOR DETECTING TARGET SUBSTANCE

(75) Inventor: Fumio Takagi, Chino (JP)

(73) Assignee: Seiko Epson Corporation (JP)

( * ) Notice: Subject to any disclaimer, the term of this patent is extended or adjusted under 35 U.S.C. 154(b) by 112 days.

(21) Appl. No.: 10/931,258

(22) Filed: Aug. 31, 2004

(65) Prior Publication Data

US 2005/0079592 A1 Apr. 14, 2005

(30) Foreign Application Priority Data

Sep. 1, 2003 (JP) ............................. 2003-309274

(51) Int. Cl.
*G01N 1/10* (2006.01)
*G01N 33/487* (2006.01)
*C12N 11/00* (2006.01)

(52) U.S. Cl. ..................... 436/180; 436/63; 422/68.1; 435/174

(58) Field of Classification Search .......... 422/99–100, 422/69, 68.1; 436/174, 180, 63; 435/174
See application file for complete search history.

(56) References Cited

U.S. PATENT DOCUMENTS

| | | | | |
|---|---|---|---|---|
| 4,101,284 A | * | 7/1978 | Difiglio et al. | 422/100 |
| 4,599,315 A | * | 7/1986 | Terasaki et al. | 435/288.4 |
| 4,689,310 A | * | 8/1987 | Kramer et al. | 436/512 |
| 4,812,856 A | * | 3/1989 | Wallace | 347/89 |
| 5,935,859 A | * | 8/1999 | Elliott et al. | 436/54 |
| 6,110,426 A | * | 8/2000 | Shalon et al. | 422/68.1 |
| 6,251,691 B1 | * | 6/2001 | Seul | 436/534 |
| 6,255,116 B1 | * | 7/2001 | Leber et al. | 436/54 |
| 6,376,256 B1 | * | 4/2002 | Dunnington et al. | 436/178 |
| 6,419,881 B1 | * | 7/2002 | Weinberg et al. | 422/99 |
| 6,429,027 B1 | | 8/2002 | Chee et al. | |
| 6,471,917 B1 | * | 10/2002 | Velkovska et al. | 422/100 |
| 6,509,085 B1 | * | 1/2003 | Kennedy | 428/188 |
| 6,887,431 B1 | * | 5/2005 | Vann et al. | 422/100 |
| 6,902,934 B1 | * | 6/2005 | Bergh et al. | 436/37 |

(Continued)

FOREIGN PATENT DOCUMENTS

| | | |
|---|---|---|
| JP | 2000-249706 | 9/2000 |
| JP | 2001-186880 | 7/2001 |
| JP | 2002-131327 | 5/2002 |

(Continued)

OTHER PUBLICATIONS

Communication from Japanese Patent Office re: related application.

*Primary Examiner*—Brian R. Gordon
(74) *Attorney, Agent, or Firm*—Harness, Dickey & Pierce, P.L.C.

(57) ABSTRACT

A device for manufacturing a bead array is provided including a container, a liquid including a bead having a biological substance fixed on a surface of the bead, and means for ejecting the liquid including the bead on a desired position on a solid-phase base. A method for manufacturing a bead array is also provided including: containing the liquid including the bead in a container; selectively ejecting the liquid on a desired position on the solid-phase base; and forming a reactive region where the liquid is ejected.

9 Claims, 4 Drawing Sheets

U.S. PATENT DOCUMENTS

| | | | |
|---|---|---|---|
| 6,946,249 B2* | 9/2005 | Head et al. | 435/6 |
| 2001/0039020 A1* | 11/2001 | Zuckermann et al. | 435/7.1 |
| 2001/0051714 A1* | 12/2001 | Chen et al. | 536/24.3 |
| 2002/0009744 A1* | 1/2002 | Bogdanov | 435/6 |
| 2002/0051971 A1* | 5/2002 | Stuelpnagel et al. | 435/6 |
| 2002/0132368 A1 | 9/2002 | Ohnishi | |
| 2003/0012699 A1* | 1/2003 | Moore et al. | 422/100 |
| 2003/0026732 A1* | 2/2003 | Gordon et al. | 422/63 |
| 2003/0153092 A1* | 8/2003 | Skinner et al. | 436/174 |
| 2003/0228241 A1* | 12/2003 | Legge | 422/100 |
| 2004/0072335 A1* | 4/2004 | Boege et al. | 435/287.2 |
| 2004/0136875 A1* | 7/2004 | Seul et al. | 422/99 |
| 2004/0163730 A1* | 8/2004 | Olson et al. | 141/130 |
| 2004/0265181 A1* | 12/2004 | Noda et al. | 422/99 |
| 2005/0118602 A1* | 6/2005 | Li et al. | 435/6 |
| 2005/0169797 A1* | 8/2005 | Oshima | 422/50 |

FOREIGN PATENT DOCUMENTS

| | | |
|---|---|---|
| JP | 2002-207040 | 7/2002 |
| JP | 2002-218767 | 8/2002 |
| JP | 2002-253233 | 9/2002 |
| JP | 2002-321359 | 11/2002 |
| JP | 2003-094658 | 4/2003 |
| WO | WO-00/39587 | 7/2000 |
| WO | WO-01/83827 A1 | 11/2001 |
| WO | WO 02/50552 | 6/2002 |
| WO | WO02/50552 A1 | 6/2002 |
| WO | WO 02/061392 | 8/2002 |
| WO | WO02/061392 A2 | 8/2002 |
| WO | WO 2004/097415 | 11/2004 |

* cited by examiner

DEVICE AND METHOD FOR MANUFACTURING BEAD ARRAY, AND METHOD FOR DETECTING TARGET SUBSTANCE

RELATED APPLICATIONS

This application claims priority to Japanese Patent Application No. 2003-309274 filed Sep. 1, 2003 which is hereby expressly incorporated by reference herein in its entirety.

BACKGROUND

1. Technical Field

The present invention relates to a device and method for manufacturing a microarray including beads having biological substances fixed on their surface, and a method for detecting a target substance.

2. Background

Recently, techniques of analyzing genes and protein have undergone rapid development and have advanced the identification of the mechanisms of cancers and other specific diseases. In order to facilitate disease diagnoses and medical checkups utilizing the analysis techniques, microarrays are expected to contribute. Examples of such microarrays include a DNA microarray and a protein microarray.

The DNA microarray is composed of a number of nucleic-acid probe spots with known base sequences aligned on the surface of a solid-phase base. Utilizing interactions (hybridization) of complementary nucleic acid sequences, the microarray captures a target nucleic acid and detects the nucleic acid by means of surface plasmon resonance (SPR) or fluorescent-molecule labeling. Since the base sequence of the nucleic-acid probe spot in which the nucleic acid has been detected is known, the DNA base sequence of a sample containing the gene of interest can be specified.

The protein microarray is used to capture target protein in biological samples (e.g. blood serum, urine, spinal fluid, synovial fluid, saliva, tissue homogenate) and various other samples containing protein (e.g. cell culture supernatant, cultured cell breaking fluid), utilizing its affinity for the surface of the spots.

For fixing the probes made of nucleic acid or protein, a method for fixing the probes as spots directly on a flat solid-phase base is described in Japanese Unexamined Patent Publication No. 2001-186880 (paragraphs 12 and 13), for example. Another method is for containing beads that, having multiple types of biological substances on their surface, in wells on a microtiter plate, fixing the beads on a terminal end of an optic fiber so as to identify them, and detecting reactions of the biological substances on the surface of the beads, which is exemplified in Japanese Unexamined Patent Publication No. 2002-533727 (paragraphs 9 and 12).

The latter method of fixing the probes made of nucleic acid or protein on the surface of the beads has advantages over the former method of fixing the probe spots directly on a flat base in various ways as follows: providing a broader surface of the solid base on which the probes are located and higher sensitivity, involving a lower risk of mutual contamination among adjacent spots, lowering the chance of the deactivation of the biological substances due to drying, and enabling proper processing of the surface of the solid-phase base that suits the types of the biological substances fixed on it. It is, however, difficult to correctly allocate a small amount of beads that have to be correctly selected from a single or adequately mixed multiple types of beads to reactive regions such as wells on a microtiter plate.

In order to address this issue, the present invention aims to provide a device and a method for manufacturing a bead array including beads having probes made of nucleic acid or protein fixed on their surface on a solid-phase base that makes it possible to accurately provide the beads in target reactive regions on the solid-phase base.

SUMMARY

The present invention provides the following:

(1) A device for manufacturing a bead array, including: a container including a liquid having a bead therein, the bead having a biological substance fixed on a surface thereof; and an ejector for ejecting the liquid including the bead on a desired position on a solid-phase base.

(2) The device for manufacturing a bead array of (1), wherein the ejector comprises an ink jetting ejector.

(3) The device for manufacturing a bead array of (1) or (2), wherein the container separately contains two or more types of liquids including beads.

(4) A method for manufacturing a bead array using the device for manufacturing a bead array of any one of (1) through (3), including the following steps: containing the liquid including the bead in a container; ejecting the liquid on a desired position on the solid-phase base; and forming a reactive region where the liquid is ejected.

(5) The method for manufacturing a bead array of (4), wherein the reactive region includes a plurality of the same type of bead on which a single type of biological substance is fixed.

(6) The method for manufacturing a bead array of (4), wherein the reactive region includes multiple types of bead groups, each bead group including beads on which a single type of biological substance is fixed.

(7) The method for manufacturing a bead array of (4), wherein: the container separately contains another liquid including a bead, the bead having a biological substance fixed on a surface thereof and an identifier; and the liquid is ejected on the solid-phase base.

(8) The method for manufacturing a bead array of (7), wherein the identifier is at least one of bead size, bead density, bead coloring, a fluorescent marker, a magnetic marker, and a radiation marker.

(9) The method for manufacturing a bead array of (4), wherein the biological substance is any one of nucleic acid and protein.

(10) The method for manufacturing a bead array of any one of (4) through (6), wherein the diameter of the bead is from 0.02 to 10 μm inclusive.

(11) The method for manufacturing a bead array of any one of (4) through (6), wherein the diameter of the bead is from 0.2 to 5 μm inclusive.

(12) The method for manufacturing a bead array of (4), wherein the solid-phase base is a microtiter plate.

(13) The method for manufacturing a bead array of any one of (4) through (12), wherein the reactive region is provided within a well on a base surface, and a cover plate is joined to the base surface while leaving a gap therebetween that is smaller than the diameter of the bead.

(14) The method for manufacturing a bead array of (13), wherein the solid-phase base and the cover plate are made of glass.

DETAILED DESCRIPTION

According to the present invention, the biological substances may be nucleic acid or protein. The nucleic acid may be partially or totally modified (including substitution). It is either oligonucleotide or polynucleotide, each of which is single-stranded or double-stranded. Preferably, it is single-stranded oligonucleotide or polynucleotide that may be partially or totally modified (including substitution). Preferable examples of the nucleic acid may include DNA, RNA, PNA (peptide nucleic acid), CNA (aminocyclohexyl ethanoic acid nucleic acid), HNA (hexitol nucleic acid), p-RNA (pyranosyl-RNA), and polynucleotide containing one of the above-mentioned. The protein contains at least two covalently-bonded amino acids. This includes protein substances, polypeptide, oligopeptide, and peptide. The protein may contain an amino acid that is found in nature and linked by a peptide bond, or may have a pseudo synthetic-peptide structure.

It is possible to detect and measure a target substance included in the nucleic acid and protein by making fluorescent labeling and monitoring changes in fluorescence intensity. Preferred examples of fluorescent molecules for the fluorescent labeling may include FITC (fluoresceinisothiocyanate), RITC (rhodamine isothiocyanate), TMRITC (tetramethylrhodamine isothiocyanate), Cy3 (carboxymethyl indocyanin), and PE (phycoerythrin).

Examples of materials for making the beads according to the present invention may include, but are not be limited to, plastic, ceramic, polystyrene, methylstyrene, acrylic polymer, triazole, carbon graphite, titanium dioxide, glass, silica, latex, and magnetic materials. The diameter of the beads according to the invention is preferably from about 0.02 to about 10 µm, and more preferably from about 0.2 to about 5 µm. The beads may not be spherical. They may also be porous to increase their surface area. The diameter of the beads may vary, but preferably the variation does not allow the bead to extend beyond the above-mentioned range.

On the surface of the beads, the biological substances serving as probes are fixed. The biological substances may be synthesized directly on the beads, or may be fixed on the beads after being synthesized. The surface of the beads may be chemically modified in advance. Examples of chemical groups found on the surface may include, but not be limited to, aliphatic- or aromatic-amine-contained amino acid, carboxylic acid, aldehyde, amide, chloromethyl group, hydroxide, hydroxyl group, sulfonate, and sulfate.

Heaters, laser light, infrared rays, electromagnetic waves, etc. can be used for providing heat for fixing the substances. The range of temperatures for fixing the substances is generally around 0 to 40 degrees centigrade, and more preferably around 20 to 35 degrees centigrade. Although reaction time is not specifically set, it is generally from half an hour to 24 hours, and more preferably from 1 to 12 hours.

In order to identify the probes made of nucleic acid and protein fixed on the surface of the beads, an identifier may be provided to the individual beads according to the present invention. Examples of the identifier may include the size, density, and coloring of the beads, and also include labeling with a fluorescent, magnetic, and radiation marker. A combination of the above-mentioned may also be used. Preferably, a fluorescent signal is used for this purpose.

The solid-phase base according to the present invention may be any base as long as it does not prevent actions of the biological substances on the surface of the beads. Examples of the base may include glass, silicon, metal (e.g. gold, silver, copper, aluminum, platinum), metal oxide (e.g. $SrTiO_3$, $LaAlO_3$, $NdGaO_3$, $ZrO_2$, silicon oxide), and resin (e.g. polyethylene terephthalate, polycarbonate) bases. The surface of the solid-phase base may be flat, and it is preferably provided with a number of concave wells formed by etching or molding as reactive regions to which the beads are supplied. Among others, glass bases are widely available and economical. Commercially available microtiter plates are also preferable as an example of a resin base.

The material, type, and thickness of the solid-phase base may be preferably selected by one skilled in the art, depending on the types of nucleic-acid or protein probes, a means for detecting a signal, and so on.

Various methods can be adopted as the means for ejecting the liquid including the beads on a desired position according to the present invention. A preferable example of is for using an ejection head having an ejection means and mounted on a carriage that is movable in the direction of an X-axis, and for placing the solid-phase base on a table that is movable in the direction of a Y-axis that is orthogonal to the X-axis. By moving the carriage and the table, the ejection head is moved to desired coordinates. This method provides an easy way to implement numerical control, which makes it possible to accurately control the ejection head. It also makes it possible to simplify the whole mechanism required.

Ink jetting, which is capable of providing a small amount of liquid with high accuracy, may be used as means for ejecting liquid according to the present invention. Ink jetting employs various techniques for ejecting liquid, including piezo jet using piezo elements, thermal jet using thermal elements, and electrostatic actuation utilizing electrostatic forces between an oscillating plate and an electrode. Preferably, the piezo jet and electrostatic actuation, which do not impart high temperature on the ejected liquid are used with temperature-sensitive biological substances.

The container according to the present invention contains two or more different types of liquids separately, each of which is ejected by an associated means for ejecting liquid. While the container can be provided separately from the means for ejecting liquid, a preferable example is providing the container and the means for ejecting liquid as a unit to the ejection bead. Providing them as a unit makes it possible to simplify the structure of the ejection head and make a path from the container to the means for ejecting liquid short, and thereby reducing the amount of consumed liquid. Also, it is possible to change liquids to be ejected by changing ejection heads.

As the liquid including the beads, multiple types of liquids each including beads on which a single type of biological substance is fixed is preferable in terms of controlling mixed beads. Different types of liquids are separately contained in the container so as not to be mixed with each other, and are ejected while being controlled separately. By controlling the ejection of the liquids separately, it is possible to form a reactive region of a single type of bead, or to form a reactive region of multiple types of beads by mixing different types of liquids at a desired ratio in the region.

Examples of the solvent for the liquid may include water, phosphate buffer solutions, TE buffer solution, buffer solutions containing sodium chloride, and solutions containing polymer. It is preferable that the solvent viscosity and surface tension be adjusted with an additive so as to be suitable for ink jetting. The viscosity is preferably 20 cp or less, and the surface tension is preferably from 20 to 40 dyn/cm. Moreover, the liquid in which the protein is diluted as a probe is preferably processed beforehand so as to remove air dissolved in the liquid.

In order to specify positions to which the liquid including the beads is supplied on a base, it is possible to form spots on a flat base according to the present invention. More preferably, solutions including the beads are supplied to wells on the solid-phase base, which results in better performance of the bead array. The wells supplied with the beads are covered, so that each well can serve as a micro reactive chamber. This structure enables the beads to move freely in the liquid for analytic use within the wells, and thereby increases the area and efficiency of reaction.

A preferable example of the above-mentioned configuration will now be described. On the periphery of the surface of the solid-phase base on which the wells are formed, a resin film or the like is provided for forming gaps and joining a cover. The thickness of the resin film is made smaller than the diameter of the beads. Next, a cover plate is joined to the resin film to cover it by forming a lid. This makes it possible to form a reactive chamber in which wells join one another through gaps smaller than the diameter of the beads. Since the gaps are small, the beads do not move to other adjacent wells. Also, if the cover plate has an inlet for supplying a target sample or reactive chemicals and an outlet for letting them out, it is possible to supply liquid with a syringe or automated assay device for a performing a reaction test. While any cover will do, a glass cover is preferable when using light for detecting target substances. After the reaction test, target substances are detected and measured.

The method for detecting target substances according to the present invention may employ various techniques. Preferable examples are detecting the amount of molecules that are fluorescent labeled and detecting coloring matters using an enzymatic reaction.

For further understanding of the invention, some aspects of the invention will now be described.

A first aspect of the invention provides a manufacturing device capable of containing multiple types of liquids including beads having biological substances fixed on their surface and ejecting the liquids on desired positions by employing ink jetting.

A second aspect of the invention provides a method for manufacturing a bead array, the method including separately containing liquids including beads, ejecting the liquids including the beads on desired positions on a solid-phase base, and forming reactive regions. This makes it possible to supply a single or multiple types of liquids in a small amount on desired reactive regions.

A third aspect of the invention provides a method for manufacturing a bead array, the method including providing reactive regions within wells on the surface of a base, and joining a cover plate to the surface of the base on which the wells are provided through gaps that are smaller than the diameter of the beads. A bead array manufactured by this method has a plurality of reactive regions within a single reactive chamber, which makes it possible to react with a number of biological substances and a target sample all at once.

In the present invention, ink jetting is preferable, which makes it possible to form a high-density array with a small amount of beads. Therefore, the required amount of samples and chemicals can be reduced. At the same time, this provides a broader surface and higher sensitivity than the microarray in which spots are formed on a base. Moreover, probe samples are fixed on the surface of the beads in advance, which makes it possible to cope with multiple kinds of samples, and avoids the deactivation of the biological substances due to drying and mutual contamination among adjacent reactive regions.

If a single type of bead is allocated to each of the reactive regions, no identifier for the beads is required since the type of the beads is discernible from the allocation on the surface. If multiple types of beads are to be identified for each region, it is possible to cope with multiple reactions, that is, the number of the reactive regions (wells) multiplied by the number of types of the beads to be identified, all at once.

The embodiment below is given by way of example, and is not intended to limit the present invention. Many variations and modifications to the embodiment can be made without departing from the spirit and scope of the invention, and they fall within the scope of the appended claims.

FIRST EMBODIMENT

Figure 1:
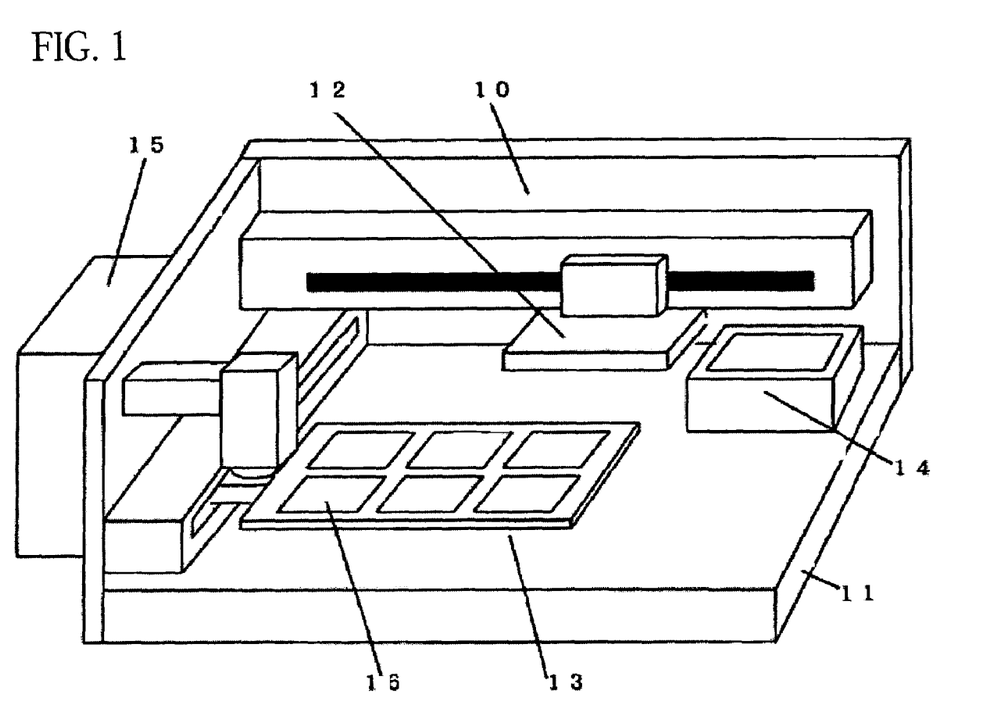
FIG. 1 is a perspective view schematically showing a bead array manufacturing device of the present invention.

FIG. 1 is a perspective view schematically showing a microarray manufacturing device according to the present embodiment. A microarray manufacturing device 10 includes, on a base 11, a cartridge holder (carriage) 12, a table 13, an absorption unit 14, and a driver 15 for driving the carriage 12 and the table 13. The cartridge holder 12 moves back and forth on an X-axis while the table 13 moves back and forth on a Y-axis that is orthogonal to the X-axis. The absorption unit 14 is placed at the home position of the cartridge holder 12, which is out of the range in which the table 13 moves, and is used for supplying liquid to be ejected. The driver 15 makes the cartridge holder 12 and the table 13 move by numerical control, for example, using a timing belt or a ball screw, so as to set a place to which the liquid is ejected on a microarray plate 16. On the cartridge holder 12, an ejection head (not shown) is mounted.

Figure 2:
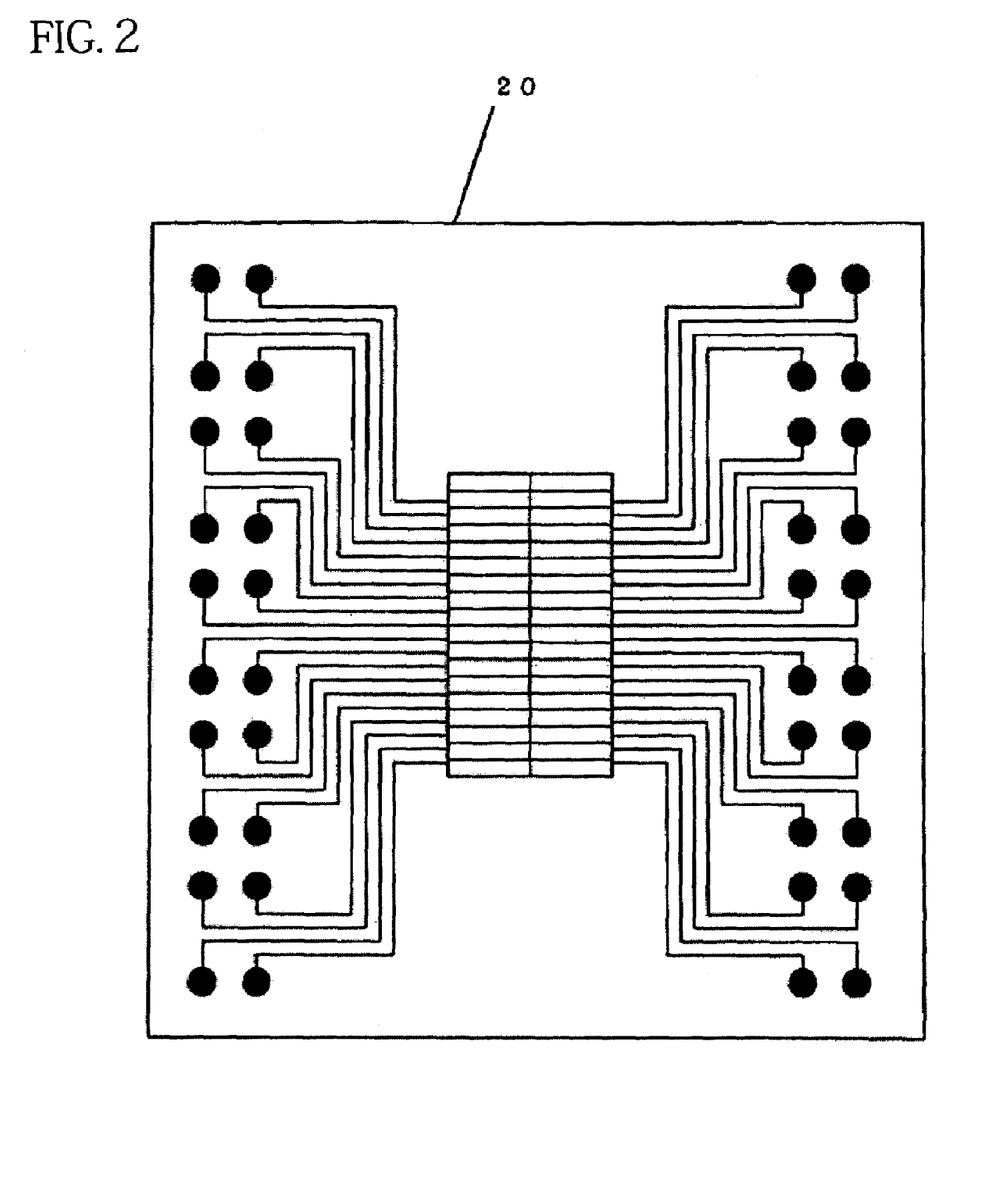
FIG. 2 is a plan view showing an ejection head.
Figure 3:
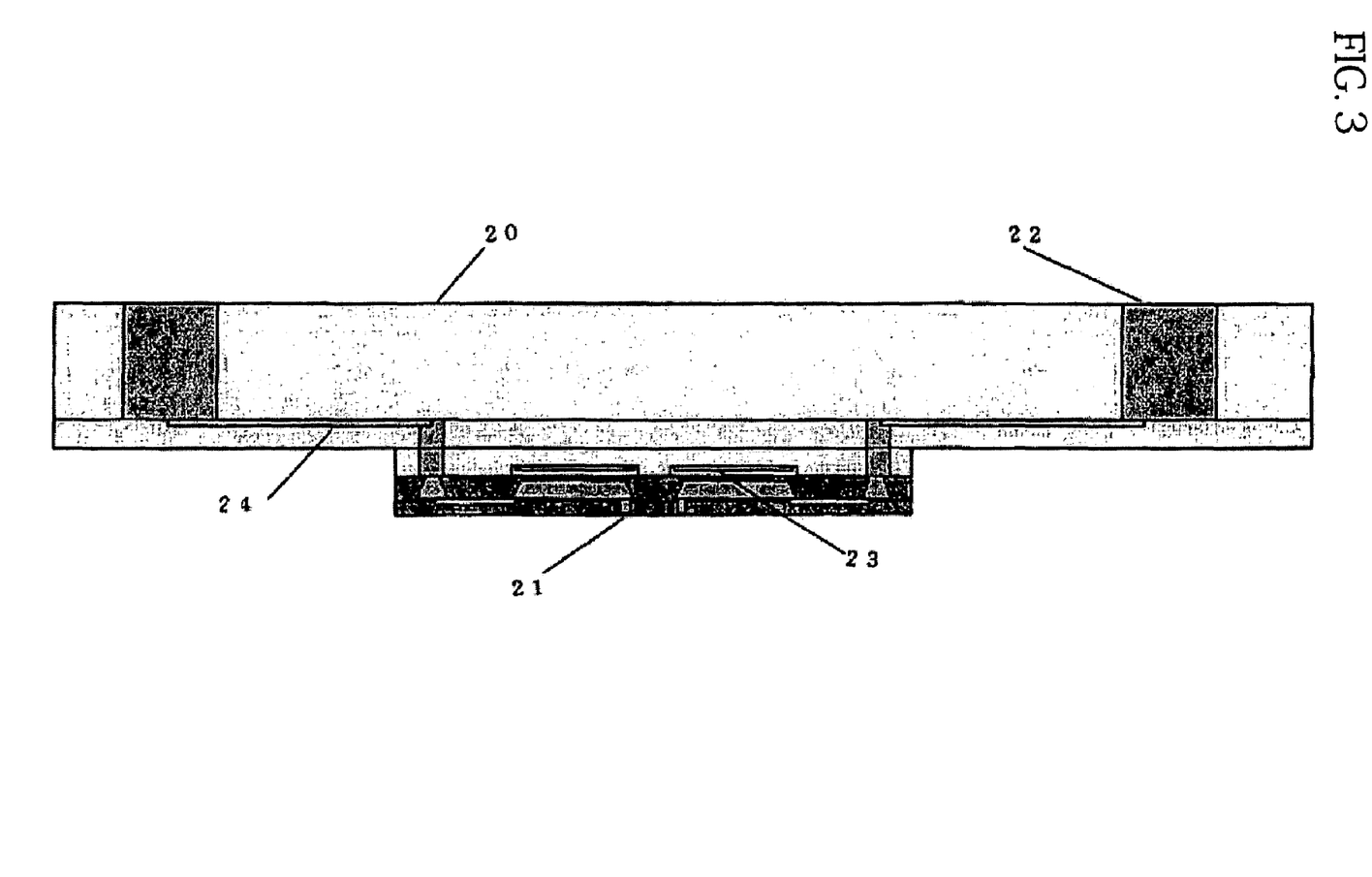
FIG. 3 is a sectional view showing the ejection head.

As an example, the ejection head was provided with an electrostatic actuator here. FIG. 2 shows the base of the ejection head 20. FIG. 3 is a sectional view of the base of the ejection head 20. The ejection head 20 includes an ejection means 21 and a container 22 as a unit. The ejection means 21 includes a pressure chamber having an oscillating plate 23 on its wall and an outlet.

Each container 22 contains liquid including beads having different types of probe samples fixed on their surface. The ejection means 21 and the container 22 are linked by a path 24. The liquid is ejected from the pressure chamber by the driving force of the oscillating plate 23, and then supplied from the container 22 by the following driving force.

Figure 4:
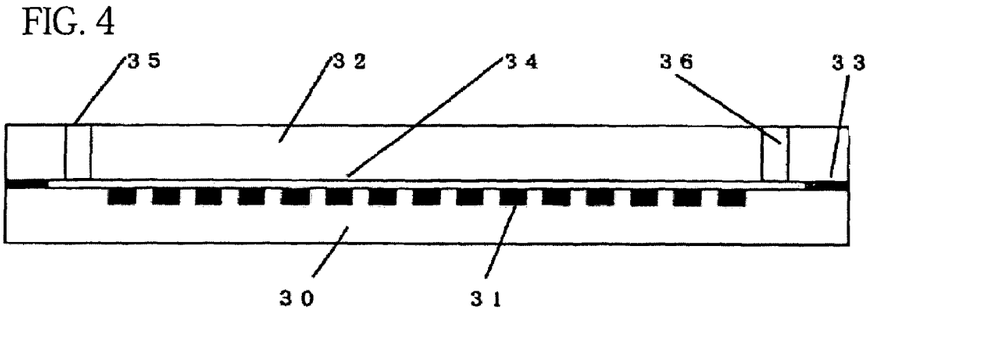
FIG. 4 is a sectional view showing a microarray plate.

As shown in FIG. 4, one-hundred twenty wells 31 are formed by etching and laid out on a glass base 30. The liquid including the beads that is described in detail below was supplied to the wells 31 by moving the carriage 12 (see FIG. 1) with the ejection head 20 (See FIGS. 2 and 3). The liquid was ejected at a drive frequency of 16 kHz and at 20 pl per drop. A single type of liquid was supplied to a single well. In another case, multiple types of liquid were supplied to a single well in order to mix different types of beads. As a result, 500 to 1000 beads were supplied to a single well.

Liquid Including Beads

Still referring to FIG. 4, several types of 4-μm-diameter spherical beads made of polystyrene and fixed to antibody protein were prepared. These beads were dispersed in a phosphate buffer solution, making a liquid including the beads (suspension).

Figure 5:
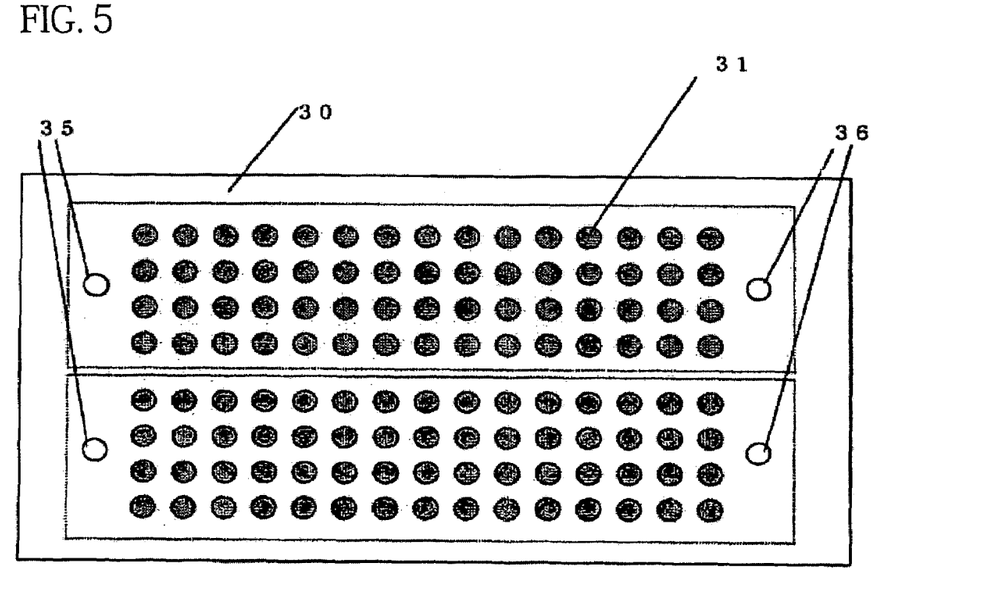
FIG. 5 is a plan view showing the microarray plate.

After supplying the beads by ink jetting, a cover glass 32 was joined to the base of the well side as shown in FIG. 5, by applying an epoxy resin adhesive 33 to a thickness of 3 μm through gaps 34.

The cover glass has an inlet 35 and outlet 36 for supplying and releasing a target sample, reactive chemicals, and the like. Liquid supplied from the inlet 35 reacts with the beads contained in the wells 31, and then is removed from the outlet 36.

What is claimed is:

1. A method for manufacturing a bead array, comprising:
    storing a liquid including a bead in a container, the bead having a biological substance fixed on a surface thereof;
    ejecting the liquid including the bead to a desired position on a solid-phase base by ink jetting the liquid including the bead;
    forming a reactive region on the solid-phase base having a cover plate joined to the base surface and a resin film disposed along the periphery of the base surface to form the reactive region within a reactive chamber in which wells join one another through gaps smaller than the diameter of the beads, where the liquid including the bead is ejected;
    separately storing another liquid including another bead in the container, the another bead of the another liquid having the biological substance fixed on a surface thereof and including an identifier, wherein the identifier is at least one of bead size and bead density; and
    ejecting the another liquid on the solid-phase base by ink jetting the another liquid.

2. The method for manufacturing a bead array according to claim 1, wherein the reactive region includes a plurality of beads, each of the beads having a single type of biological substance fixed thereto.

3. The method for manufacturing a bead array according to claim 1, wherein the reactive region includes a plurality of bead groups, each bead group having a single type of biological substance fixed to each bead of the group.

4. The method for manufacturing a bead array according to claim 1, wherein the biological substance comprises any one of nucleic acid and protein.

5. The method for manufacturing a bead array according to claim 1, wherein a diameter of the bead is from about 0.02 to about 10 μm inclusive.

6. The method for manufacturing a bead array according to claim 1, wherein a diameter of the bead is from about 0.02 to about 5 μm inclusive.

7. The method for manufacturing a bead array according to claim 1, wherein the solid-phase base comprises a microtiter plate.

8. The method for manufacturing a bead array according to claim 1, wherein the solid-phase base and the cover plate comprise glass.

9. A method for manufacturing a bead array, comprising:
    storing a liquid including a bead in a container, the bead having a biological substance fixed on a surface thereof;
    ejecting the liquid including the bead to a desired position on a solid-phase base by ink jetting the liquid including the bead;
    forming a reactive region on the solid-phase base where the liquid including the bead is ejected by joining a cover plate to the base surface covered with a resin film disposed along the periphery of the base surface to form the reactive region within a reactive chamber in which wells join one another through gaps smaller than the diameter of the beads;
    separately storing another liquid including another bead in the container, the another bead of the another liquid having the biological substance fixed on a surface thereof and including an identifier, wherein the identifier comprises at least one of bead size and bead density used in combination with at least one of a bead coloring, a fluorescent marker, a magnetic marker, and a radiation marker; and
    ejecting the another liquid on the solid-phase base by ink jetting the another liquid.

* * * * *

UNITED STATES PATENT AND TRADEMARK OFFICE
CERTIFICATE OF CORRECTION

PATENT NO. : 7,253,006 B2 Page 1 of 1
APPLICATION NO. : 10/931258
DATED : August 7, 2007
INVENTOR(S) : Fumio Takagi It is certified that error appears in the above-identified patent and that said Letters Patent is hereby corrected as shown below:

Column 4, Line 24: delete "of is for" and replace with --is--

Column 4, Line 52: "bead." should be --head.--

Column 5, Line 34: delete "a", second occurrence

Column 8, Line 10 Claim 6: "0.02" should be --0.2--

Signed and Sealed this

Sixth Day of November, 2007

JON W. DUDAS
*Director of the United States Patent and Trademark Office*